UNITED STATES PATENT OFFICE.

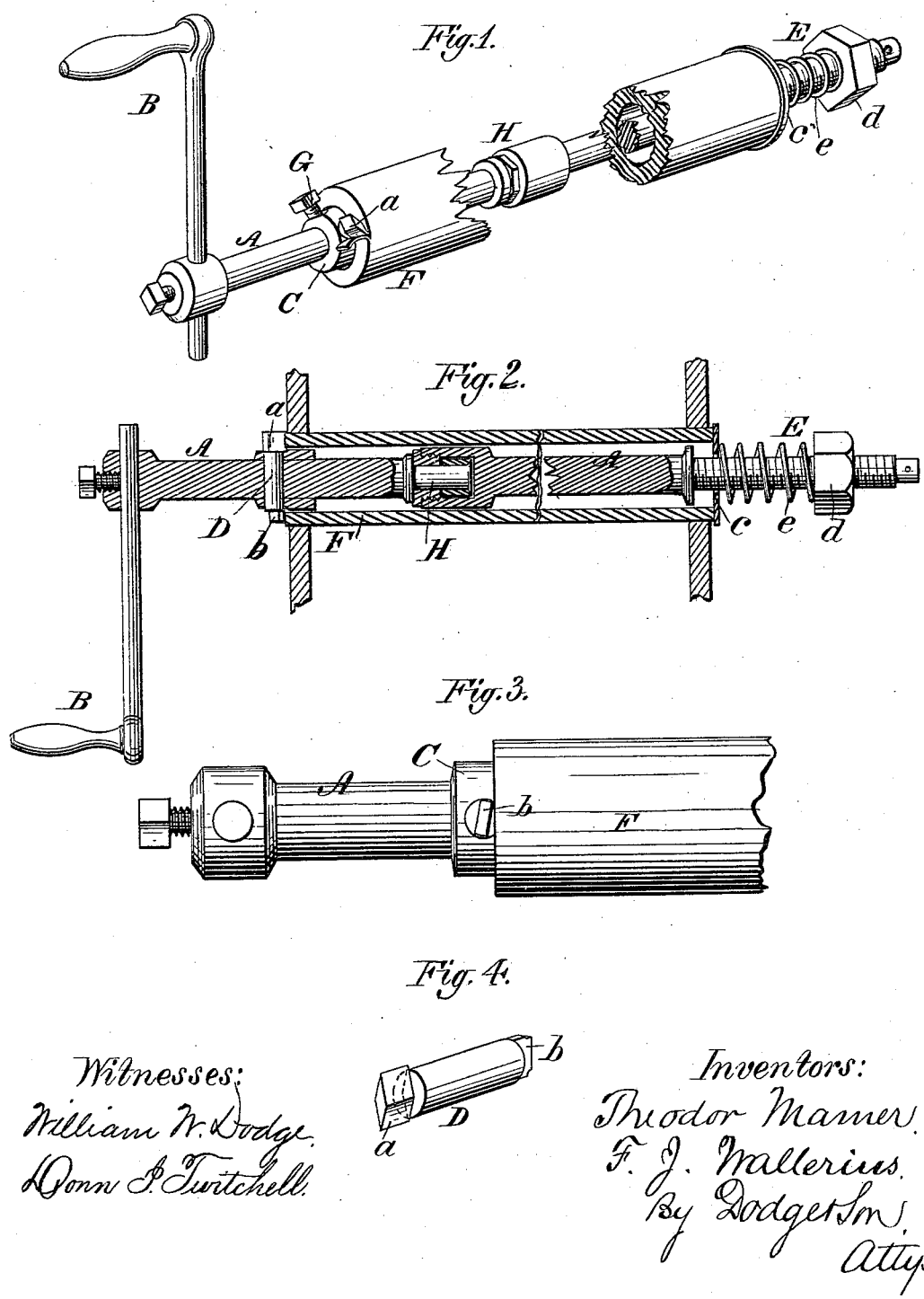

THEODOR MAMER AND FRANZ J. WALLERIUS, OF HASTINGS, MINNESOTA.

IMPROVEMENT IN TUBE-CUTTERS.

Specification forming part of Letters Patent No. 213,293, dated March 18, 1879; application filed January 24, 1879.

*To all whom it may concern:*

Be it known that we, THEODOR MAMER and FRANZ JOS. WALLERIUS, of Hastings, in the county of Dakota and State of Minnesota, have invented certain Improvements in Tube-Cutters, of which the following is a specification:

Our invention relates to a device for squaring the ends and reducing the length of metal pipes and tubes, and is more especially designed for cutting off the projecting ends of boiler-tubes after they are passed through the sheets.

The device consists, essentially, of a rod or stem, to be passed longitudinally through the pipe or tube, provided at one end with a crank or handle and a projecting cutter, and at the opposite end with a take-up or feed device to hold the cutter against the end of the pipe or tube.

The invention also consists in a cutter of peculiar construction, in means for regulating the depth of its cut, and in certain details of construction, hereinafter explained.

Figure 1 represents a perspective view of our improved device, partially broken away; Fig. 2, a longitudinal central section of the same; Fig. 3, a side elevation of a portion of the device, showing the manner of regulating the depth of cut; and Fig. 4, a perspective view of the cutter and gage.

In the drawings, A represents a rod or stem, provided at one end with a crank or handle, B, by which to rotate it, and with an enlargement or collar, C, in which is secured a cutter, *a*, while at its opposite end the rod or stem A is furnished with a take-up or feed device, E, as shown. The rod A is made of sufficient length to pass through and extend beyond the end of the tube or pipe on which it is to operate, and the enlargement or collar C should be of a size to fill, or nearly fill, the end of the same, and thereby serve to center the rod in the tube or pipe, as shown in Figs. 1 and 2. When thus constructed, the cutter *a*, projecting from the side of the collar C, will be caused to travel around on the end of the tube or pipe F steadily and evenly as the rod or stem A is rotated, the take-up or feed device E serving to hold the cutter against the end of the tube or pipe and insure an even pressure and certainty of action.

The cutter may be of any suitable or usual form, though in practice we prefer to use one of the form shown more clearly in Fig. 4. This consists of a double-edged blade, *a*, formed upon one end of a cylindrical stem or body, D, as shown, this body being passed through the rod A and collar C, and capable of rotation therein, whereby either one or the other of its cutting-edges may be brought into position for action. When adjusted at the proper inclination and with the desired edge in position for action, the cutter is held by means of a clamping-screw, G, passing through the collar C and bearing upon the body D of the cutter.

In order that the depth of cut or the thickness of the shaving taken off by the cutter may be perfectly regulated and controlled, the body D is provided at the end opposite the cutting-blade *a* with a flat-faced lug or projection, *b*, as shown in Figs. 2, 3, and 4, which bears against the end of the pipe or tube, and prevents the blade *a* from sinking into the same beyond a certain depth. By turning the cylindrical body D in its seat, the inclination of the cutter and the position of the lug or projection *b* are simultaneously changed, the latter also changing the depth to which the blade *a* may sink.

The cutter-blade *a* is made to extend farther on one side of the center of the stem or body D than on the other, in order to give as great a range of adjustment as possible to the depth of cut.

The take-up or feed device E consists of a washer, *c*, passed over the end of the rod, and resting against the end of the pipe or tube opposite that on which the cutter operates, a nut, *d*, screwed onto the end of the rod, and a spring or elastic body, *e*, bearing at its ends against the washer and nut, and forcing the latter, and with it the rod A, backward, thereby drawing the cutter firmly against the forward end of the pipe or tube. By adjusting the nut *d* the tension of the spring may be perfectly regulated.

In order that the nut *d* may not be turned forward or back upon the rod A, or the rod be screwed farther through the nut, and thereby alter the tension of the spring through the act of rotating the rod, and for the further purpose of avoiding the friction that would result from rotating the entire rod and its feed or take-up device, a swivel-joint, H, is formed in the rod between its ends, as shown in Figs. 1 and 2.

The collar C may be made solid with the rod or stem A; or it may be made separate, and held in place by the body D of the cutter passing through it and the rod A, or by other means, this latter arrangement permitting collars of different diameters, adapted to fit tubes or pipes of different sizes, to be secured readily upon the rod or stem A.

The rod or stem A may be made in sections, keyed or otherwise fastened together, whereby it may be readily lengthened or shortened, as occasion may require.

It is obvious that any other feeding or take-up device than that shown may be employed—as, for instance, a screw-stem passing through a stationary nut—though the arrangement shown and described is preferred.

Having thus described our invention, what we claim is—

1. In a tube-cutter, the combination of a rod adapted to extend through the tube, a cutter secured thereto at one end, and a take-up at the opposite end, adapted to draw the cutter against the tube, substantially as described.

2. In a tube-cutter, the combination of a rod, A, provided with a swivel-joint, a radially-projecting cutter adapted to operate on one end of the tube, and a take-up to bear against the opposite end of the tube, and serving to advance the cutter.

3. In combination with the rod A and the cutter thereon, the feed or take-up device consisting of the washer $c$, nut $d$, and spring $e$.

4. The jointed rod A, provided with a collar or enlargement, C, and cutter $a$, substantially as shown.

5. In combination with the rotatable rod A, the reversible diamond-shaped cutter $a$, secured thereto and carried thereby, substantially as shown.

6. The rotatable plug or body D, provided at opposite ends with a cutting-blade, $a$, and gage-lip $b$, as shown.

THEODOR MAMER.
FRANZ JOS. WALLERIUS.

Witnesses:
GEO. BARBARAS,
E. A. WHITFORD.